(12) United States Patent
Kelly et al.

(10) Patent No.: US 7,789,104 B2
(45) Date of Patent: Sep. 7, 2010

(54) BACKFLOW PREVENTING APPARATUS FOR WATER CLOSETS

(76) Inventors: Thomas Earl Kelly, 1625 Holly Tree Rd., Baltimore, MD (US) 21220; Stephanie C. Kelly, 1625 Holly Tree Rd., Baltimore, MD (US) 21220; William Harley Frankenfield, 22 Loveton Farms Ct., Sparks, MD (US) 21152

( * ) Notice: Subject to any disclaimer, the term of this patent is extended or adjusted under 35 U.S.C. 154(b) by 373 days.

(21) Appl. No.: 11/898,816

(22) Filed: Sep. 17, 2007

(65) Prior Publication Data

US 2009/0071552 A1 Mar. 19, 2009

(51) Int. Cl.
*F16K 15/03* (2006.01)
(52) U.S. Cl. .................. 137/521; 137/527; 137/433
(58) Field of Classification Search .......... 137/527, 137/527.2, 527.6, 527.8, 520, 521, 517, 519, 137/247.15, 247.19, 433; 4/276, 269, 280, 4/281, 266, 471, 422, 426, 679
See application file for complete search history.

(56) References Cited

U.S. PATENT DOCUMENTS

| | | | | |
|---|---|---|---|---|
| 474,843 | A | * | 5/1892 | Mahan et al. ............ 294/68.22 |
| 3,726,341 | A | * | 4/1973 | Holbert, Jr. ................. 166/321 |
| 4,005,724 | A | * | 2/1977 | Courtot ....................... 137/38 |
| 4,384,910 | A | | 5/1983 | Prodyma |
| 4,482,161 | A | | 11/1984 | Izzi, Sr. |
| 4,555,820 | A | * | 12/1985 | Dragstrem ................. 4/255.06 |
| 4,637,079 | A | | 1/1987 | Hodge |
| 5,078,739 | A | * | 1/1992 | Martin ....................... 623/2.27 |
| 6,085,363 | A | | 7/2000 | Huber |
| 6,199,576 | B1 | | 3/2001 | Young |
| 6,325,356 | B1 | | 12/2001 | Rozenblatt |
| 6,848,471 | B2 | | 2/2005 | Floh et al. |
| 7,240,378 | B2 | * | 7/2007 | Long et al. ................... 4/252.1 |
| 2004/0172745 | A1 | | 9/2004 | Hatfield |
| 2005/0188452 | A1 | | 9/2005 | Hatfield |

* cited by examiner

*Primary Examiner*—Stephen Hepperle
*Assistant Examiner*—Macade Brown
(74) *Attorney, Agent, or Firm*—Breneman & Georges

(57) ABSTRACT

An automatically activated backflow prevention device for water closets or toilets is provided having a substantially cylindrical support member terminating in one end in a cam shaped end for mating with a hinged flapper valve having a parabolic shaped or upwardly curving upper surface and correspondingly shaped sealing member disposed therebetween for mating with the cam shaped end of the substantially cylindrical support member. An elastomeric hinge member is provided for connecting the closure member or flapper valve to the substantially cylindrical support member so that when closed the flapper valve or closure member conforms to the confronting cam shaped end of the cylindrical support member with the sealing member disposed therebetween.

A backflow water pressure responsive assist member is optionally provided on the lower surface of the closure member to assist in the closure of the closure member in response to backflow water pressure from waste pipes.

20 Claims, 10 Drawing Sheets

BACKFLOW PREVENTING APPARATUS FOR WATER CLOSETS

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON COMPACT DISC

Not applicable.

REFERENCE TO A "MICROFICHE APPENDIX"

Not applicable.

BACKGROUND OF THE INVENTION

1. Field of the Invention

The invention pertains to backflow prevention devices for use in drains and in particular soil pipes. More particularly the invention pertains to an automatically activated water backflow prevention device having one end disposed in a wax or elastomeric sealing ring of a water closet and the other end disposed in a soil pipe. The end disposed in the soil pipe has a cam shaped end for accommodating a closure member having a substantially parabolic shaped upper surface and a substantially parabolic shaped lower surface with an elastomeric sealing member disposed between the cam shaped end and the closure member so that the closure member in the open position has a low profile by substantially conforming to the inside cylindrical shape of the waste pipe and in the closed position seals the cam shaped end of the backflow prevention device.

2. Description of the Related Art Including in the U.S. Information Disclosed Under 37 CFR 1.97 and 1.98

One of the biggest problems is the backflow of sewage from sewer waste pipes through the water closet in homes, apartments and businesses, particularly in low lying areas. The problem of backflow of sewer water through sewer pipes is generally caused by excessive rain fall or incapacity of the sewer system to handle the amount of rainwater or sewage that is dumped into the sewage processing plants. As a result backflow pressure builds up until pressure in the lines exceeds the capacity of the system causing sewage or backup flows in homes and business in lower lying areas. In the meantime those homes and businesses at higher elevations continually empty more water and sewage into the entire system causing further backflow pressure causing a further backflow of sewage in which the lowest areas receive the most sewage and backflow pressure which when unchecked backflows into successively higher areas.

The problem of backflow sewage in sewage systems into homes, apartments and businesses is particularly aggravated by the fact that many sewer systems are old and do not have sufficient capacity and older developments are usually located in lower areas while more recent construction occurs on higher ground causing an overall increase in backflow pressure in the older lower lying areas. This problem of old sewer systems and inadequate capacity is further compounded by longer sewer lines that are stretched to reach more remote outlying areas from the treatment plant which puts further demands on the system which becomes overwhelmed during periods of heavy rainfall and during periods when the water saturation in the soil is particularly high.

A number of prior art efforts have been made to provide a toilet backflow preventing system and valve such as represented by Hodge U.S. Pat. No. 4,637,079. In this prior art a toilet backflow preventing valve is conveniently provided between the soil pipe mounting flange and the drain horn of the toilet. The valve of Hodge U.S. Pat. No. 4,637,079 is manually activated by pushing or pulling a rod that is connected to a sliding valve to open and close the connection between the soil pipe drain and the toilet bowl.

The problem with prior art such as Hodge '079 is that a person needs to be present to observe the problem and then close the valve to prevent the backflow of sewage or remember to open the valve before flushing the toilet. Many times sewage backflow occurs when people are either not in their homes or in their businesses or when they are asleep and the sewage system becomes overwhelmed. As a result an inexpensive system is needed that automatically closes a valve upon detecting a backflow pressure and which otherwise remains open without interfering with the normal operation of the water closet. It would be further advantageous to dispose such an automatic check valve between the drain horn of the toilet and the soil pipe.

Other prior art such as Hatfield U.S. Publication Nos. 2005/0188452 and U.S. 2004/0172745 provides a backflow preventing attachment for toilets which remains in the closed position in normal operation and opens whenever the toilet is flushed. The system of Hatfield utilizes a duckbill shaped insert composed of two halves which automatically open and close in response to water pressure. Backflow water pressure causes the duckbill system of Hatfield to remain closed while flushing the toilet temporarily opens the duckbill to allow the contents of the toilet to be discharged into the sewage system.

The Hatfield system provides an advantage over the Hodge U.S. Pat. No. 4,637,079 prior art by providing an automatic system for solving the problem except where matter such as toilet paper becomes lodged on one portion of the duckbill or where waste builds up along the surface of the duckbill eventually preventing complete closure and sealing of the duckbill. A fully automatic system such as Hatfield has a further limitation in that the duckbill portions of the valve can not fully open in such a manner as to be completely out of the way of material in the toilet from emptying into the soil pipe. More particularly the elements of the duckbill do not assume a low profile or zero profile to flow of the contents of the toilet into the soil pipe.

There are also numerous examples of other types of inline check valves which are disposed portions of drain pipe such as Floh, et al. U.S. Pat. No. 6,848,471 and Young U.S. Pat. No. 6,199,576. Such backflow preventers are many times expensive to produce and difficult to install as they are disposed in portions of the line not readily accessible. For example Young U.S. Pat. No. 6,199,576 utilizes a bidirectional clean out with a built in backflow preventer having a check valve which allows fluid to flow in only one direction. Young U.S. Pat. No. 6,199,576 utilizes a rod attached to the check valve to lower the check valve into the sewer line through a bidirectional clean out pipe. The check valve in Young U.S. Pat. No. 6,199,576 is automatic but requires the installation of special bidirectional clean out pipes outside of the dwelling, apartment or business and is not conveniently located between the interface between the sewer pipe and toilet.

Huber U.S. Pat. No. 6,085,363 pertains to a water closet fitting with a removable test baffle which test baffle has a concave upper surface and a convex lower surface. The Huber U.S. Pat. No. 6,085,363 provides a removable test baffle to check the integrity of the seal after the water closet drain system has been installed in a permanently set floor such as concrete. After testing for the fluid tightness of the water closet fitting the removable test baffle is removed through an access clean out port in the sewer line. As a result the water closet fitting with test baffle is not a check valve and does not remain in the sewer line to prevent water backup.

Other prior art such as Izzie U.S. Pat. No. 4,482,161 pertains to gaskets disposed between the water closet and the sewer pipe. Izzie U.S. Pat. No. 4,482,161 gasket provides a substitution for the traditional wax ring which is used most commonly in prior art toilet installations. As pointed out in Izzie U.S. Pat. No. 4,482,161 the problem with wax rings is the seal can become broken where the toilet is installed on an uneven floor which allows the seepage and escape of sewer gases from the sewer pipe between the interface between the toilet and the floor. Izzie U.S. Pat. No. 4,482,161 does not have a backflow check valve and unlike the present invention utilizes a reusable gasket of rubber like material for installation of the water closet.

The invention in contrast to all the prior art provides an automatically activated check valve which responds to backflow pressure to close the sewer pipe and can utilize either the traditional wax ring for sealing the interface between the toilet and the sewer pipe or a natural or synthetic elastomeric gasket a combination of a wax ring together with a natural or synthetic elastomeric ring shaped seal for sealing the interface between the sewer pipe, toilet horn and the floor.

The prior art also includes various types of toilet valves that are not particularly relevant to the invention such as rotary gate valves for aircraft vacuum toilet systems such as illustrated by Rosenblatt U.S. Pat. No. 6,325,356. Other prior art also not particularly relevant pertains to inline check valves for pressurized systems such as Floh, et al. U.S. Pat. No. 6,848,471. These and other prior art patents provide for valves in pressurized lines and systems that are complicated in design and expensive to produce and difficult to install.

The invention in contrast pertains to a simple, inexpensive to produce and easy to install device that remains open and assumes a low to zero profile in the axial direction of flow in a sewer pipe and automatically closes upon receiving backwater pressure. The novel backflow preventing valve of the invention utilizes a substantially circular support member terminating in a cam shaped end for accommodating a check valve which has a curved or parabolic shaped upper surface and a curved or parabolic shaped lower surface that is attached to the support member by a hinge and may optionally include a backflow water pressure responsive assist means for assisting in the closure of the check valve in response to backflow water pressure.

As will be recognized by those skilled in the art there is a need for a device which is conveniently installed and automatically activated by backflow water pressure to close the toilet from the sewer line to prevent the backflow of sewage. There is also a need for a device that is simple and inexpensive to produce and easily installed to solve a major problem confronting home owners, apartment owners and businesses in areas that are subject to sewage backflow.

There is also a need for a device that has a low to a zero profile in a sewer pipe and remains open when there is no backflow pressure and effectively closes automatically upon the presence of sewage backflow. There is also a need for a backflow prevention valve that remains open and does not impede the ordinary flow of sewage but which when activated by backflow water pressure automatically closes to prevent the inflow of sewage from a sewage line. These requirements for an efficient automatic backflow prevention system are provided by the invention.

BRIEF SUMMARY OF THE INVENTION

The invention provides an inexpensive, efficient and easily installed soil pipe backflow prevention device designed especially for toilets and water closets to prevent the backup of sewage through the sewer pipe and through the toilet into a business or dwelling. The novel backflow prevention device has a substantially circular support member or pipe which terminates at one end in a cam shaped end which in the preferred embodiment includes a beveled edge. The substantially cylindrical support member or pipe includes a hinge to which is connected a closure member. The closure member has an upwardly curving upper surface and an upwardly curving lower surface where the substantially curving upward surface and lower surfaces are preferably substantially parallel by having about the same radius of curvature. The closure member is thus of a substantially parabolic shape for mating with the cam shaped end of the substantially cylindrical support member.

The hinge connecting the substantially cylindrical support member or pipe to the parabolic shaped closure member may be attached to the upper surface or lower surface of the parabolic shaped closure member. In the preferred embodiment of the invention the hinge is connected to the outside surface of the substantially cylindrical support member and to the lower surface of the parabolic shaped closure member. The hinge may be made of various materials but preferably is made of a natural or synthetic rubber material or a high polymer elastomeric material which may include a living hinge. The hinge connecting the support member to the closure member may have a thermally or mechanically formed bending area formed between the elastomeric segments of the hinge member. The hinge member may be made in a single piece or two pieces in which the two portions of the hinges are connected together with a pin as is commonly done in door latch hinges.

The upper surface of the parabolic shaped closure member preferably includes an elastomeric sealing means between the upper surface of the parabolic shaped closure member and the cam shaped and preferably beveled end of the substantially cylindrical support member. Alternatively an elastomeric sealing material may be placed around the circumference of the cam shaped surface to assist in the sealing between the parabolic shaped closure member and the substantially cylindrical support member. The parabolic shaped closure member is made of a lightweight material such as plastic to allow backflow water pressure buoyant force to lift the closure member into the closed position.

On the lower side of the parabolic shaped closure member a backflow water pressure responsive assist means may be provided to assist in closing the closure member. The backflow water pressure responsive assist means may include a closed cell elastomeric or plastic material containing air which assists in the lifting of the closure or may include a mechanical notch in the lower surface of the closure member to assist in lifting the closure member from a position in substantial axial alignment to the waste pipe to a position of closure on the confronting surface of the cam shaped substantially cylindrical support member. The backflow water pressure responsive assist means may be a combination of both mechanical indentations or channels in the closure members as well as an elastomeric material having closed cells attached to the closure member or a combination thereof.

The other end of the substantially circular support member may include a ring like structure including a wax sealing ring or elastomeric sealing member for disposition between the toilet and the standard soil pipe mounting flange. Alternatively the other end of the substantially circular support member may be sized and shaped to accept a traditional wax ring in which the novel waste pipe backflow prevention device can be part of or secured to the plastic support member of a traditional wax ring. In further embodiments of the invention the end of the substantially circular support member opposite to the cam shaped end may include various rubber or elastomeric type seals for sealing between the toilet soil pipe and floor or may include a combination of wax, plastic and elastomeric layers to increase the efficiency between the soil pipe, toilet and floor to prevent any inflow of sewage or gases from the soil waste pipe or water closet.

BRIEF DESCRIPTION OF THE SEVERAL VIEWS OF THE DRAWINGS

The advantages of the invention will become apparent to those skilled in the art from the following detailed description of the invention in conjunction with the illustrative drawings in which.

DETAILED DESCRIPTION OF THE INVENTION INCLUDING BEST MODE

Figure 1:
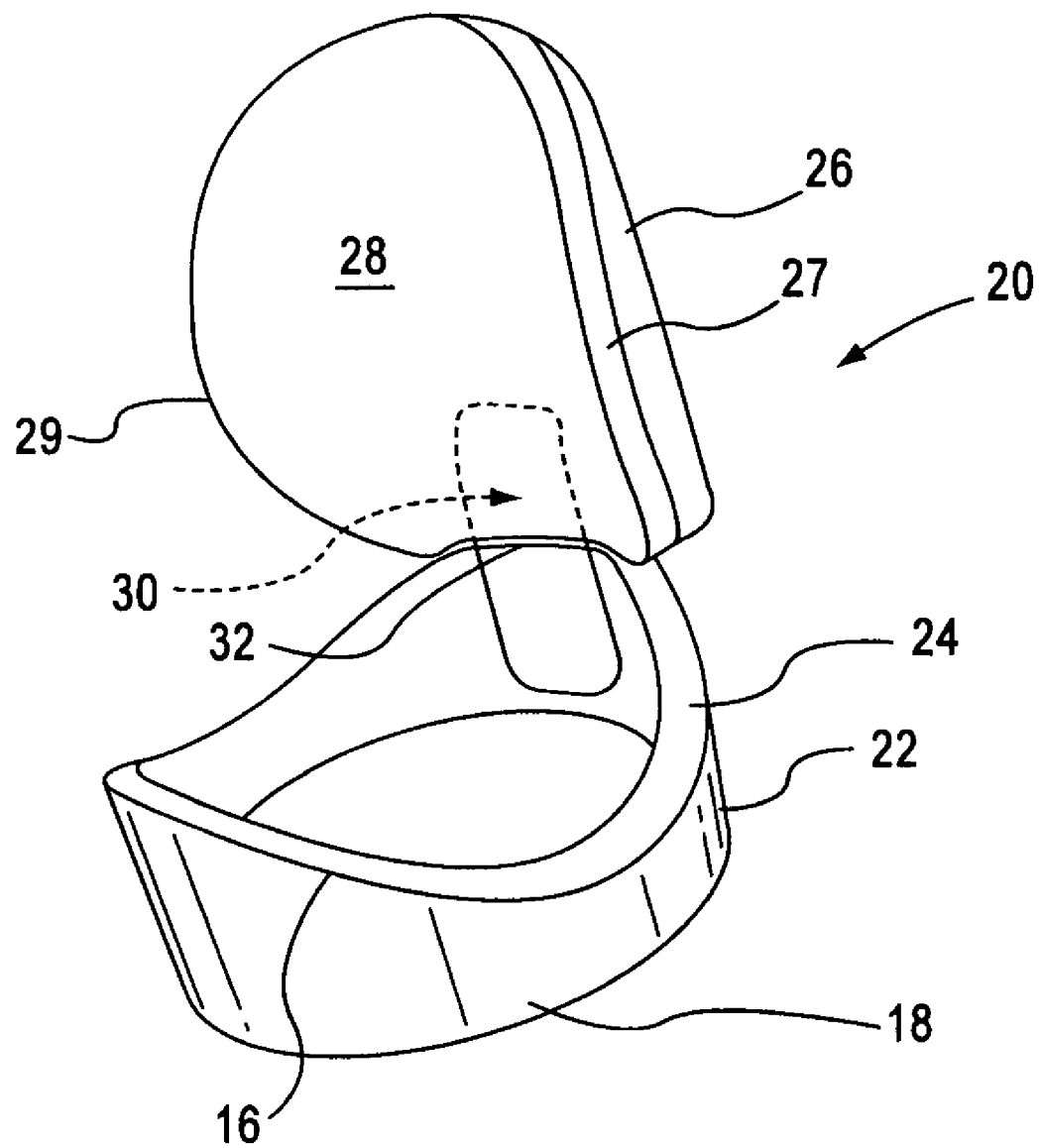
FIG. 1 is a perspective view of one embodiment of the novel backflow prevention device.

A check valve for disposition in a soil pipe which stays open and provides an unimpeded flow of waste from a water closet when there is no back pressure and automatically closes upon the sensing of a back pressure is illustrated in FIG. 1. The novel backflow preventing valve 20 has a substantially cylindrical support or pipe 22 which has a first end 16 and a second end 18. The substantially cylindrical support or cylindrical pipe 22 terminates at end 16 in a cam shaped profile 24 which includes an outwardly tapered edge 25 (FIGS. 8, 9, 11 and 12) for providing a seat for a curved or parabolic shaped closure member 26. The parabolic shaped closure member 26 has upwardly tapering ends 27 and 29 for seating into the cam shaped profile 24 of the substantially cylindrical support or pipe 22.

A hinge 30 is provided for connecting substantially cylindrical support or pipe 22 with closure member 26. In this embodiment of the invention the hinge 30 is connected to the inside of substantially cylindrical support member or pipe 22 and the inside surface of the closure member 26. The hinge may be made of a single piece elastomeric or rubber material having a hinge or flexible portion 32 for bending to allow the closure member 26 to seat against the cam shaped profile 24. An optional sealing surface 28 may be provided on the closure member 26 and one of the ends of the hinge 30 may be disposed between the closure member 26 and the sealing surface 28.

The substantially cylindrical support member or pipe 22 may be made out of any type of material but is preferably made out of plastic pipe as commonly used in the plumbing industry. Similarly closure member 26 may be made out of any material but is preferably made of a lightweight material such as a plastic material which corresponds to a plastic material traditionally used in a plastic drain pipe. Sealing surface 28 may be rubber or any other elastomeric material but is preferably composed of closed cell elastomeric material to increase the integrity of the seal between the cam shaped end and closure member 26 to prevent the inflow of backflow water.

Figure 2:
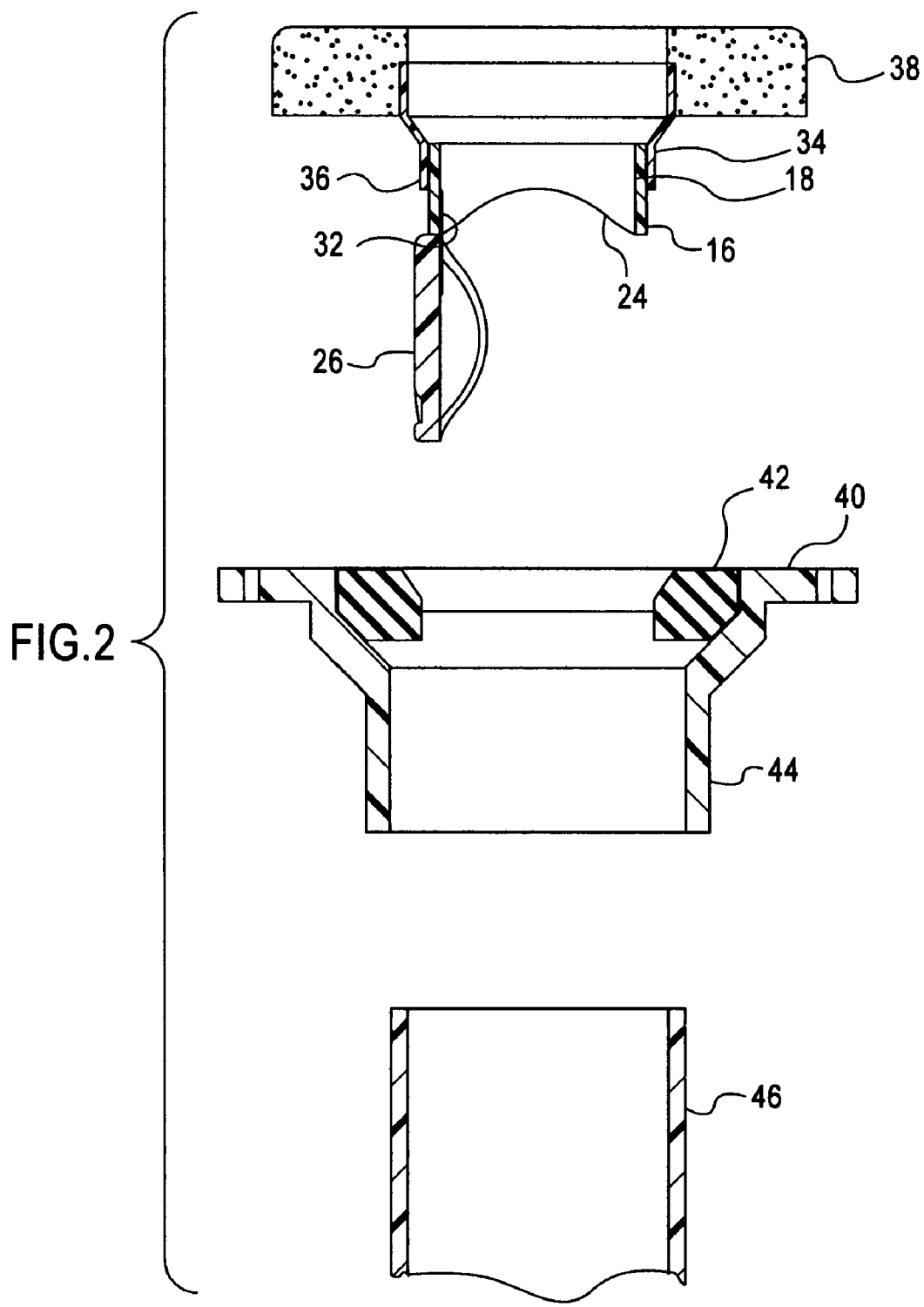
FIG. 2 is a cross sectional exploded view of an application of the novel backflow prevention device.

Referring now to FIGS. 1 to 12 the novel backflow preventing valve is illustrated in greater detail and in its application in a toilet waste pipe. The novel backflow preventing valve 20 is attached to a wax ring support 34 by joining end 18 to the wax ring support 34 utilizing joining compound or plastic weld as is traditionally used by plumbers in joining plastic pipe. Once the novel backflow preventing valve is joined to the wax ring support 34 the wax ring 38 with wax is placed inside soil pipe flange 40 which is generally surrounded by a rubber gasket 42 (FIG. 2). Soil pipe flange 40 has an end 44 which is connected to the sewer pipe line 46.

Figure 3:
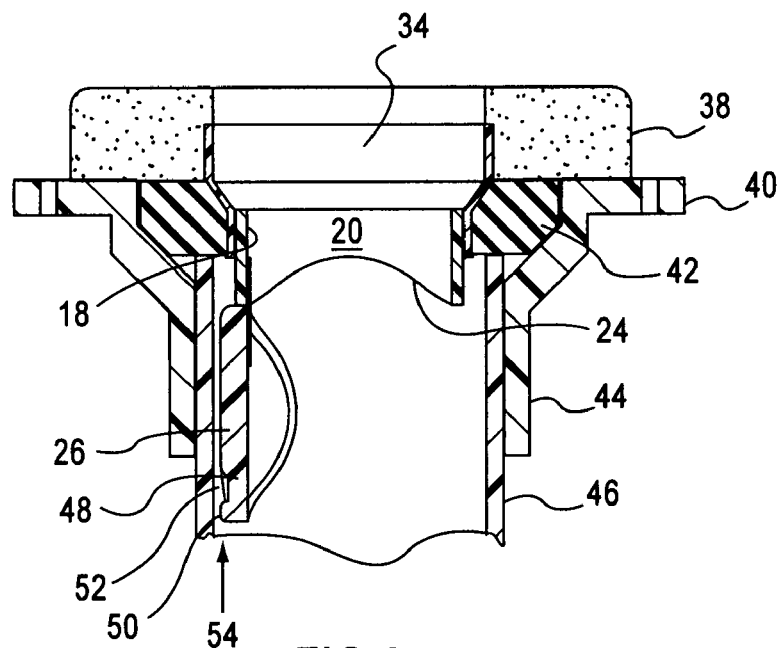
FIG. 3 is a cross sectional side elevational view illustrating the novel backflow prevention device disposed in a soil pipe.
Figure 4:
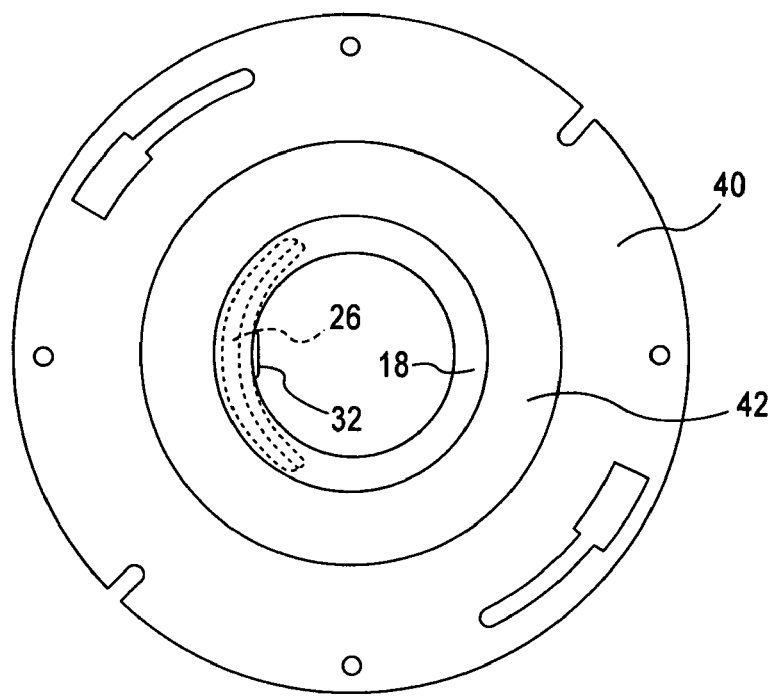
FIG. 4 is a top plan view of the novel backflow prevention device disposed in a soil pipe.

The novel backflow preventing valve 20 is designed to remain open within soil pipe end 44 and sewer pipe line 46 in such a way that the parabolic shaped closure member maintains a low to zero profile in the short distance between the closure member 26 and the sewer pipe line 46 as illustrated in FIGS. 3 and 4. In this manner the novel backflow prevention valve as illustrated in FIGS. 3 and 4 in operation provides a semi circular low to zero profile that is not in the way of any waste and is not seen when it is installed in the soil pipe. The toilet or water closet is then placed over the wax ring which results in the deformation of the wax ring and a seal between the horn of the toilet, the wax ring and floor in the same manner as is utilized in ordinary plumbing installations.

Figure 5:
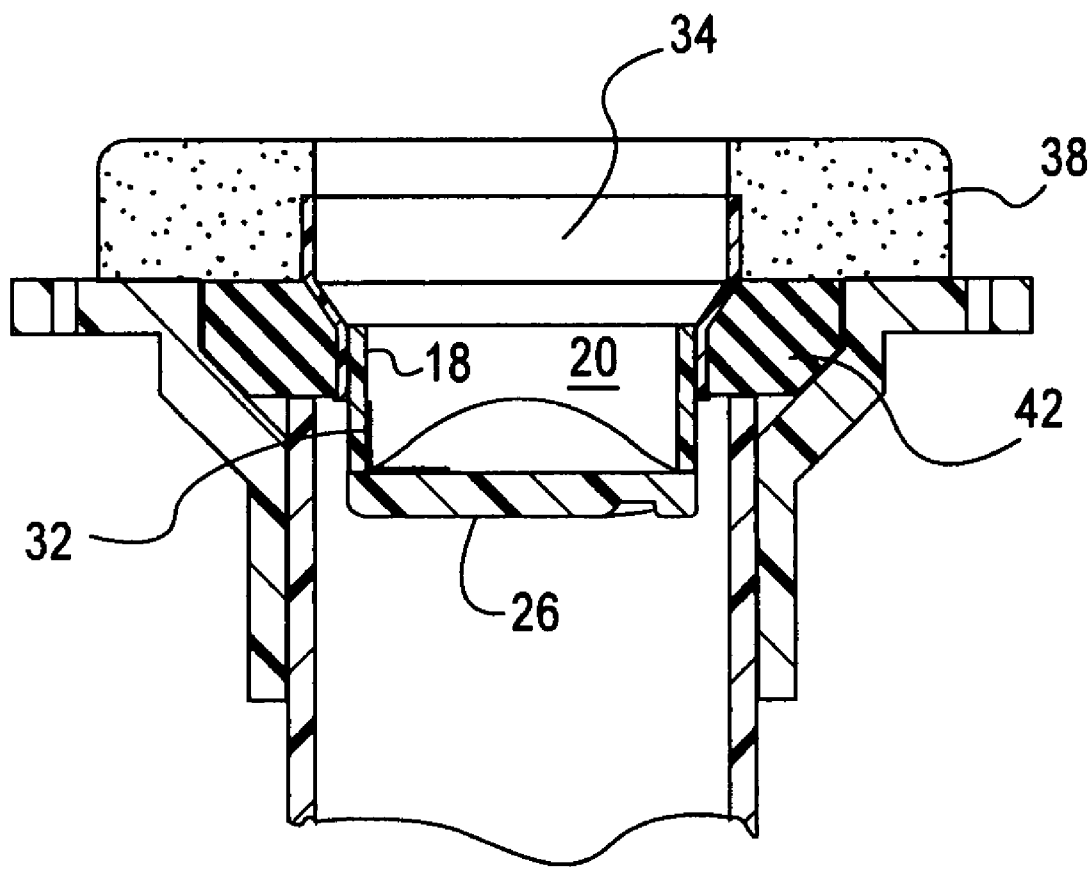
FIG. 5 is a cross sectional side elevational view of the novel backflow prevention device in its closed position disposed in a soil pipe.

Once installed the backflow preventing valve remains held open by gravity until such time as backflow water or backflow pressure enters the sewer pipe line 46 and enters channel 50 (FIG. 3) and enters chamber 52 as illustrated by arrow 54 resulting in the lifting of the closure member 26. The closure member 56 is preferably made of plastic material and is of a light weight sufficient to result in backwater pressure lifting or the tilting of the closure member and closing the check valve so that the parabolic shaped closure member seals against the confronting cam shaped profile to prevent backwater from entering into the water closet or toilet as illustrated in FIG. 5.

Figure 6:
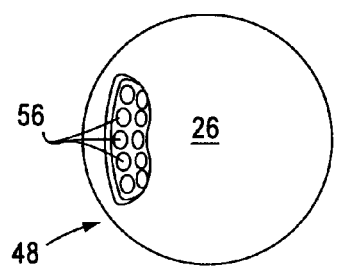
FIG. 6 is a bottom plan view of the novel backflow prevention device with the closure member in its closed position.
Figure 7:
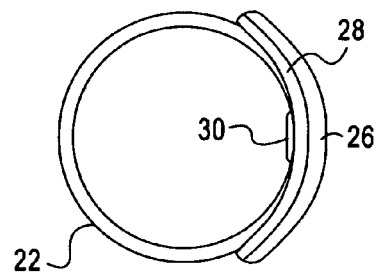
FIG. 7 is a bottom plan view with the closure member in its open position.
Figure 8:
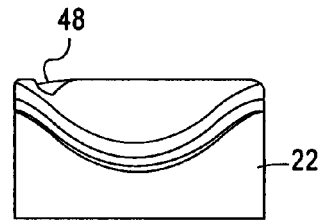
FIG. 8 is a side elevational view of the novel backflow prevention device.
Figure 9:
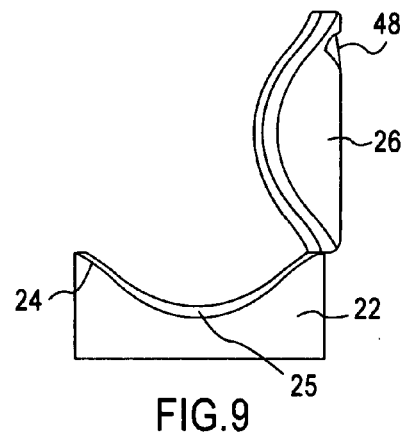
FIG. 9 is a side elevational view of the novel backflow prevention device.

The closure member optionally has a backflow water pressure responsive assist means or notch located on the outside surface to provide a chamber 52 so that backflow water pressure assists in closing the closure member 26. The backflow water pressure responsive assist means can be a notch, channel or other water pressure responsive assist means such as cork but is preferably constructed of plastic containing small closed cell air cells to assist in the lifting or closure of the closure member 26. As illustrated in FIG. 6 a backflow water pressure responsive assist means may include a layer of plastic having closed cell air bubbles 56 to assist in the closure of the closure member 26 upon receiving backwater pressure.

Figure 13:
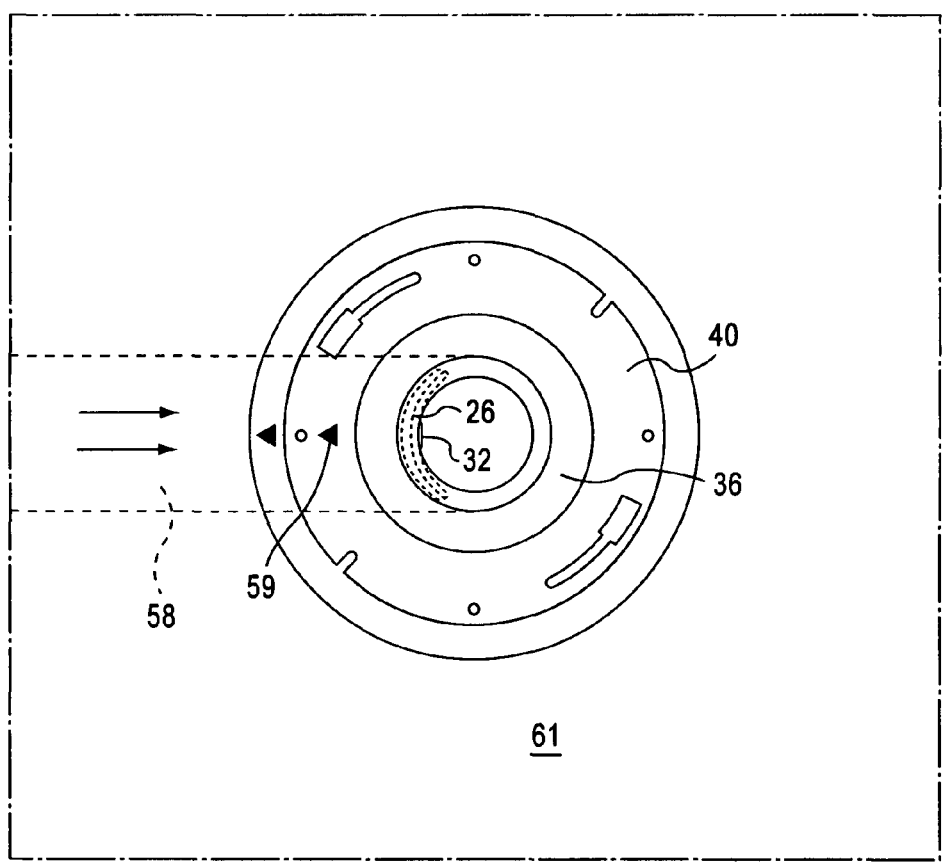
FIG. 13 is a top plan view of a novel backflow prevention device with an orientation marking in accordance with a preferred embodiment of the invention.

The parabolic surfaces of the check valve closure member 26 are designed to substantially conform to the inside curvature of the waste pipe and provide a low to zero profile and an unrestricted flow of water from the water closet down through the waste pipe as illustrated in FIGS. 4 and 13. The closure assisting mechanism on the lower side of the closure member is similarly designed to provide a low profile closure member preferably on the end opposite to the hinge connecting the closure member to the housing. The end of the substantially circular housing member opposite the end having the cam shaped profile is preferably attached to the water closet sealing member may be an elastomeric sealing member, a wax sealing member, a wax ring or a combination of a wax ring with an elastomeric sealing member for providing a seal between the water closet and the soil pipe.

Figure 10:
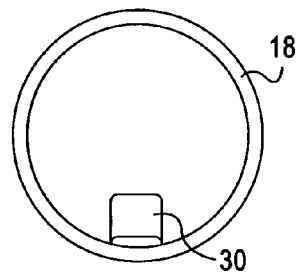
FIG. 10 is a top plan view of the novel backflow prevention device with the closure member in its closed position.
Figure 11:
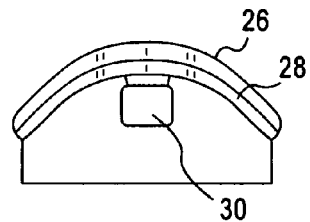
FIG. 11 is a side elevational view from the rear side of the novel backflow prevention device.
Figure 12:
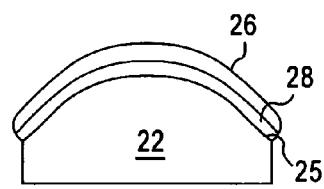
FIG. 12 is a side elevational view from the front of the novel backflow prevention device.

Referring now to FIGS. 6-12 the novel backflow preventing valve is illustrated in further detail illustrating the closure member 26 having a sealing and flotation surface 28 (FIG. 7) for sealably engaging cam shaped profile 24 (FIGS. 8 and 9) which cam shaped profile includes a taper 25 to assist in the seating of the closure member to the substantially cylindrical support member or pipe 22. The substantially cylindrical support member or pipe may be composed of a clear plastic material such as plexiglass as illustrated which allows a clear view of the hinge member 30 as illustrated in FIGS. 10 and 11. The closure member when closed is designed to fit into the cam shaped profile of substantially cylindrical support member 22 and provide increased sealing area by having the parabolic shaped closure member fit onto the cam shaped profile and into the tapered edge 25 as illustrated in FIG. 12.

Figure 14:
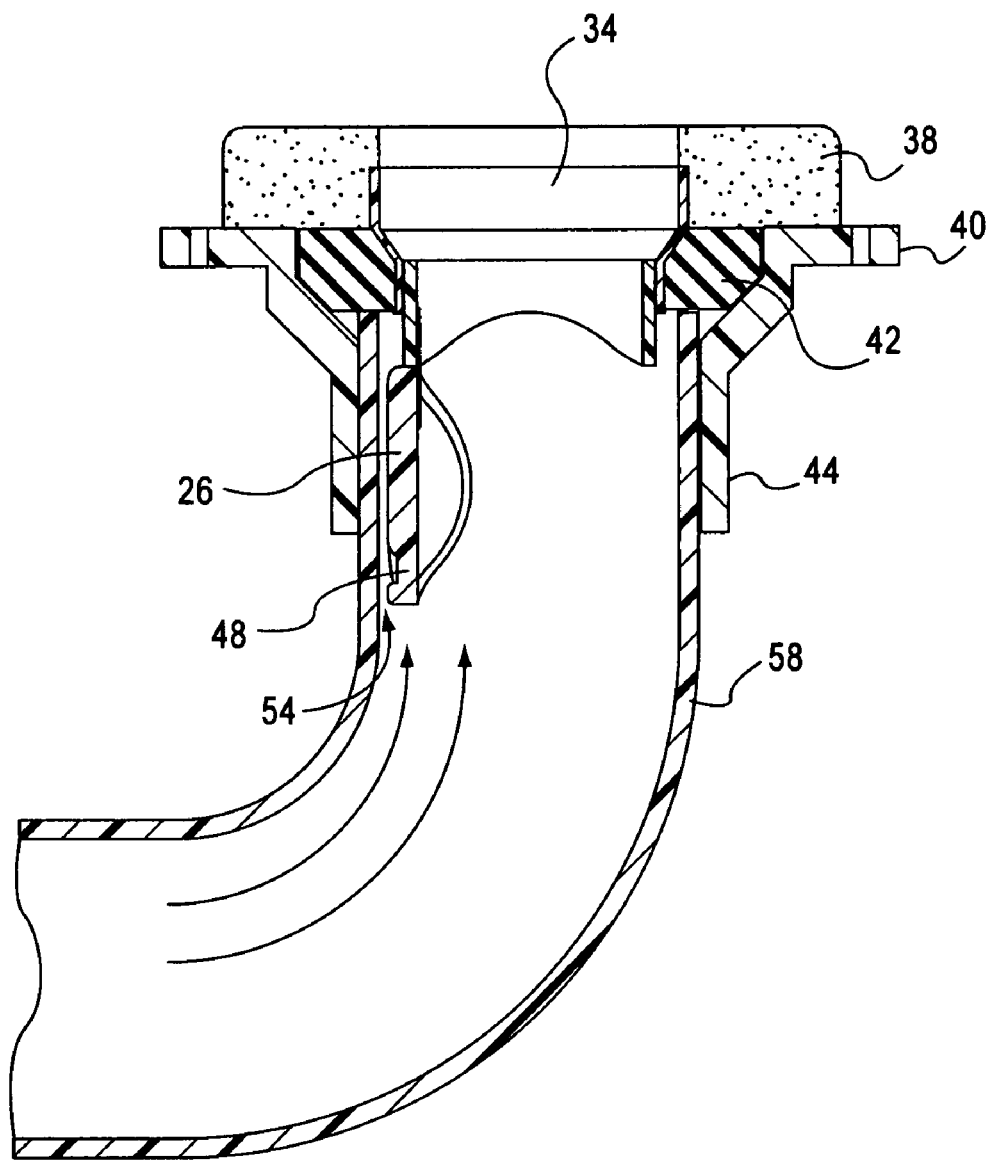
FIG. 14 is a cross sectional side elevational view of a novel backflow prevention device in a standard three inch curved soil pipe.
Figure 15:
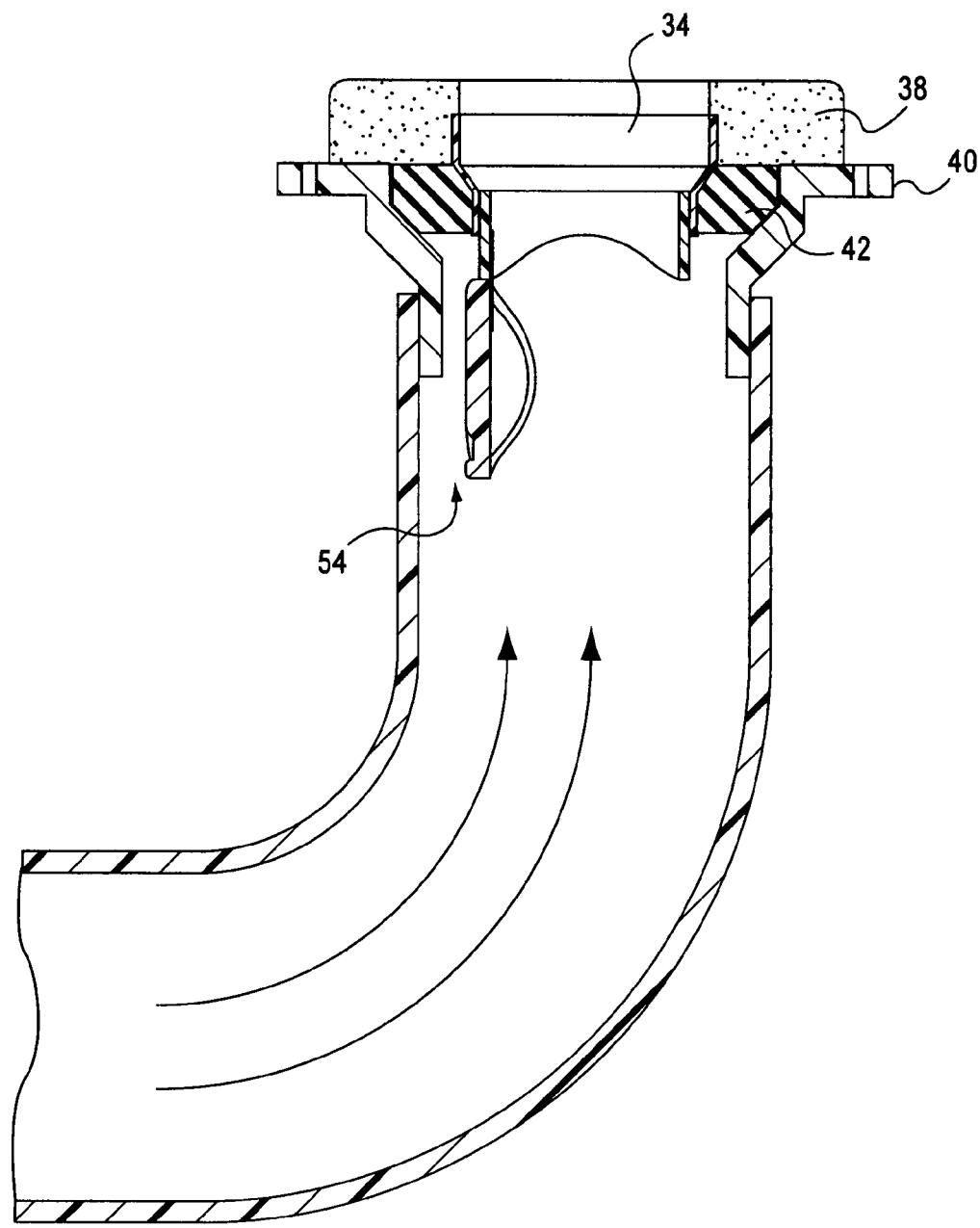
FIG. 15 is a cross sectional side elevational view similar to FIG. 14 of a novel waste pipe backflow prevention device in a standard four inch pipe.

Referring now to FIGS. 13, 14 and 15 a further application of the novel backflow preventing valve is illustrated in embodiments having a curved waste pipe 58. In such embodiments it is important to have the closure member 26 oriented to hang down in the same direction as the side of shortest curvature of the curved waste pipe 58 as illustrated in FIGS. 14 and 15. FIGS. 14 and 15 illustrate the same embodiment of the invention except that in FIG. 14 one of the standard used waste pipe of a three inch diameter is illustrated whereas in FIG. 15 the other standard four inch waste pipe is illustrated.

In both applications of the invention as illustrated in FIGS. 14 and 15 it is useful to orient the backflow preventing valve 20 so that the closure member 26 hangs down in the waste pipe 58 on the side having the shortest curvature as illustrated in FIGS. 14 and 15. To assist in orienting the novel backflow preventing valve a means for rotationally orienting the backflow apparatus is provided. In FIG. 13 one of the means is a marker or marking 59 to assist in the rotational orientation of the novel backflow preventing valve with respect to curved waste pipe 58. This arrangement is particularly useful where a concrete base 61 is utilized to install toilets or water closets in basements or low areas that are particularly prone to damage from backup from sewers and drains.

Figure 16:
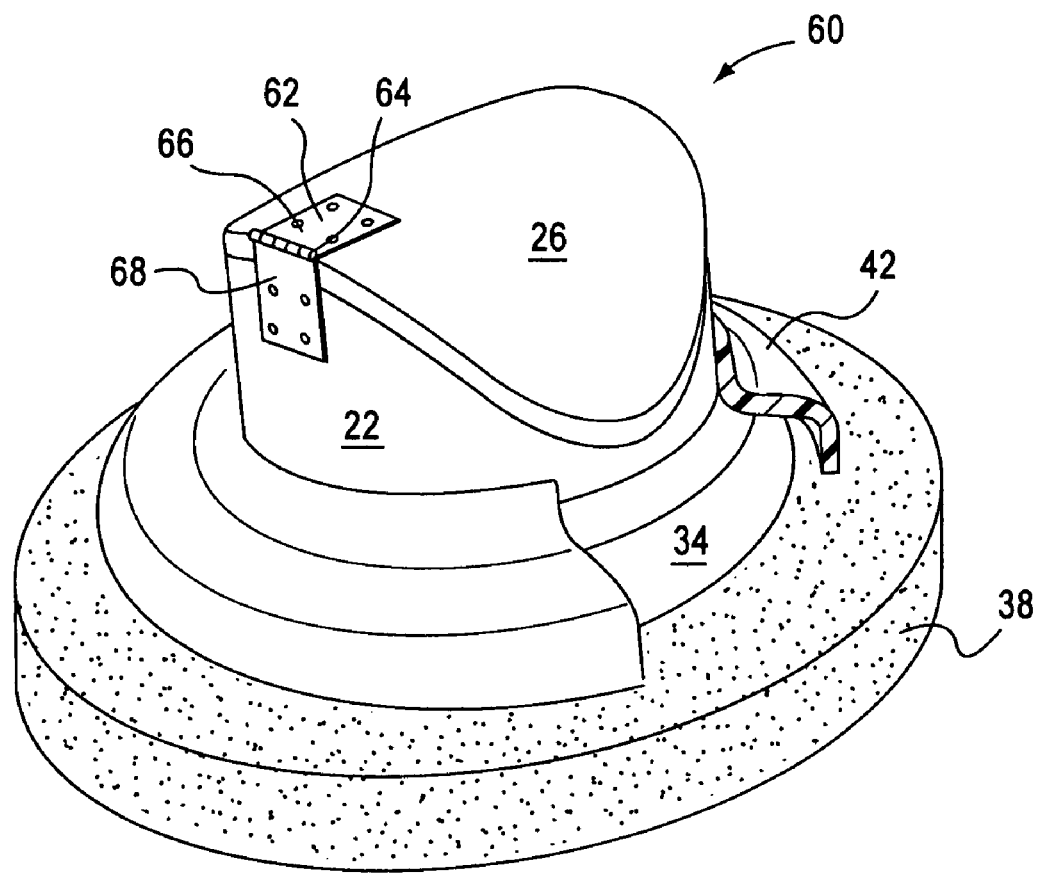
FIG. 16 is a bottom perspective view of a preferred embodiment of the novel waste pipe backflow prevention device in its closed position.
Figure 17:
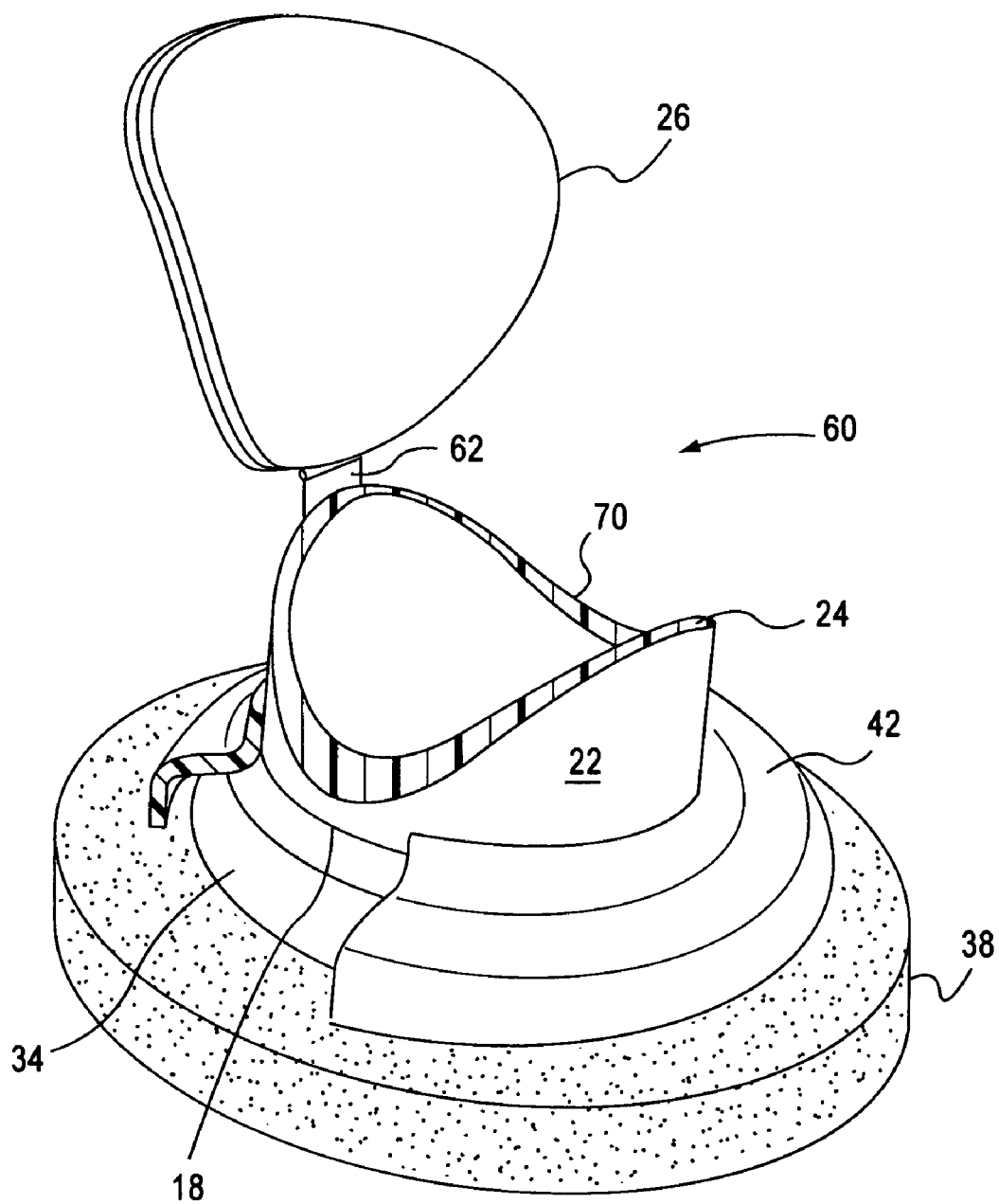
FIG. 17 is a bottom perspective view of FIG. 16 with the closure device in an open position.

Referring now to FIGS. 16 and 17 a novel backflow preventing valve in accordance with the best mode of the invention is illustrated. The backflow preventing valve 60 as illustrated in FIGS. 16 and 17 have the same components and low to zero profile of backflow preventing valve 20 as previously discussed. The backflow preventing valve 60 in accordance with the best mode of the invention however has a hinge 62 held together by a connecting pin 64. The hinge 62 however is disposed on the outside surface of the substantially cylindrical support member or pipe as well as on the outside surface of the closure member 26.

This arrangement of placing the hinge on the outside of the substantially cylindrical support member or pipe and lower surface of the closure member 26 further reduces the profile of the closure member and removes the edge of the hinge 32 to the flow of waste material from the toilet as had been illustrated in FIG. 4. Otherwise the novel backflow preventing valve 60 operates and functions in much the same way as the backflow preventing valve 20 as previously discussed. The other difference is that the novel backflow preventing device 60 of the best mode hangs down lower in the waste line 46 and is more easily susceptible to being closed by waste water backflow pressure. The pin 64 also provides a more positive pivoting point for hinge 62 than is provided with a living hinge or a hinge entirely made of a rubber material. As illustrated in FIG. 16 one half of hinge 62 or part 66 is attached to the outside surface of closure member 26 and the other half of hinge 62 or part 68 is connected to the outside surface of substantially cylindrical support member 68 with the two halves connected with connecting pin 64.

In the best mode of the invention the end 18 of substantially cylindrical support or pipe 22 is attached to or integral with support 34. Support 34 may be a wax ring support or a support for a natural or synthetic rubber seal member for sealing the interface between the soil pipe flange 40, toilet and a floor or concrete base 61.

A further embodiment of the invention includes the placement of a sealing surface 70 on the cam shaped profile 24 of substantially cylindrical support 22 as illustrated in FIG. 17. In this embodiment the sealing surface 70 can be rubber or a closed cell elastomeric material that is disposed only on the cam shaped profile of substantially cylindrical support or pipe 22 or on both pipe 22 and closure member 26. Where sealing surface 70 is on the cam shaped profile 24 the parabolic shaped closure member can be a single layer of plastic which when closed closes again sealing surface 70 on cam shaped profile 24 of the substantially cylindrical support member or pipe 22.

The invention may be implemented in various ways and the novel backflow preventing check valve can be manufactured and sold as a unitary piece with a wax ring or elastomeric ring or may be sold as a separate piece which can be joined at the jobsite by a plumber to the wax ring. It will also be appreciated that the novel backflow preventing valve may be constructed of materials although fabrication of the novel backflow preventing check valve in plastic is preferred. Where the novel backflow check valve includes a wax ring or sealing gasket the gasket or sealing ring may be made of natural rubber or synthetic man made elastomeric material or a combination thereof to increase the sealing capacity between the interface between the soil pipe flange, toilet horn and floor.

The invention is susceptible to a number of changes and modifications as will be made in the application of the novel backflow preventing device of the invention by those skilled in the art. Such changes or modifications may include moving the sealing member from the closure member to the cam shaped profile at the end of substantially cylindrical support member or pipe as has heretofore been described. The invention may also include modifications of the end of the support member opposite the cam shaped end to include various types of sealing arrangements between the toilet and the soil pipe flange and floor or changes or modifications to the hinge as heretofore has been discussed or other such changes and modifications which are deemed to be within the scope of the appended claims.

As used herein and in the following claims, the word 'comprising' or 'comprises' is used in its technical sense to mean the enumerated elements include but do not exclude additional elements which may or may not be specifically included in the dependent claims. It will be understood such additions, whether or not included in the dependent claims, are modifications that both can be made within the scope of the invention. It will be appreciated by those skilled in the art that a wide range of changes and modification can be made to the invention without departing from the spirit and scope of the invention as defined in the following claims:

What is claimed is:

1. A wastepipe backflow prevention device comprising:
   (a) an automatically activated closure member having at least two layers and an upwardly curving upper surface and an upwardly curving lower surface with at least one of said two layers being a layer to withstand backflow water pressure;
   (b) a substantially cylindrical support member having a first end terminating in a cam shaped profile and a second end;
   (c) a hinge means connecting said substantially cylindrical support member to said closure member; and
   (d) a closed cell sealing and flotation surface disposed on said upwardly curving upper surface to provide a seal between said automatically activated closure member and said substantially cylindrical support member and to impart buoyancy to said closure member.

2. The wastepipe backflow prevention device of claim 1 further comprising a tapered edge disposed on said cam shaped profile.

3. The wastepipe backflow prevention device of claim 1 further comprising backflow water pressure responsive assist means for closing said closure member.

4. The wastepipe backflow prevention device of claim 3 wherein said backflow water pressure responsive assist means is a closed cell elastomeric material.

5. The wastepipe backflow prevention device of claim 3 wherein said backflow water pressure responsive assist means is a concave notch shaped indentation on said upwardly curving lower surface of said pipe closure member.

6. The wastepipe backflow prevention device of claim 5 wherein said upwardly curving lower surface has a radius of curvature greater than the radius of curvature of said upwardly curving lower surface.

7. The wastepipe backflow prevention device of claim 5 wherein said hinge means is an elastomeric strip having one end attached to the inside diameter of said substantially circular support member and the other end attached to said upwardly curving lower surface with a living hinge disposed between said ends of said elastomeric strip.

8. The wastepipe backflow prevention device of claim 5 wherein said hinge means is a mechanical hinge having one end of said hinge means attached to the outside surface of said substantially circular support member and the other end connected to said upwardly curving lower surface with a pin interconnecting said ends of said hinge means.

9. The wastepipe backflow prevention device of claim 1 further comprising a wax sealing ring disposed on said second end of said substantially circular support member.

10. The wastepipe backflow prevention device of claim 1 further comprising a man made or synthetic rubber seal disposed on said second end of said substantially circular support member.

11. A wastepipe backflow prevention apparatus comprising:
    (a) a substantially circular support member having a first end and a second end terminating in a substantially circular and radially sinusoidal shaped end;
    (b) a two layered closure member having a substantially parabolic shaped lower surface layer and a substantially parabolic shaped upper surface layer corresponding to said sinusoidal shaped end of said substantially circular support member said substantially parabolic shaped lower surface layer providing a pressure withstanding layer; and
    (c) an elastomeric hinge disposed in or on said substantially circular support member connecting said substantially circular support member to said closure member, said elastomeric hinge terminating in a closed cell sealing and flotation surface disposed on said substantially parabolic shaped upper surface layer to provide a seal between said closure member and said substantially circular support member and to impart buoyancy to said closure member to automatically close said closure member on said substantially circular support member.

12. The wastepipe backflow prevention apparatus of claim 11 further comprising a wastepipe to toilet to floor sealing means disposed on said second end of said substantially circular support member.

13. The wastepipe backflow prevention apparatus of claim 11 further comprising means on said first end of said substantially circular support member for rotationally orienting said backflow prevention apparatus in a wastepipe.

14. The wastepipe backflow prevention apparatus of claim 11 further comprising a wax ring disposed on said first end of said substantially circular support member.

15. A backflow prevention device comprising:
    (a) a two layered substantially parabolic shaped valve member automatically opened by gravity and closed by a liquid backflow pressure said substantially circular valve member having a substantially parabolic shaped upper surface and substantially parabolic shaped lower surface;
    (b) a substantially circular support pipe having a first end and a second end said second end terminating in a substantially cam shaped valve seat corresponding to said substantially parabolic shaped upper surface of said parabolic shaped valve member;
    (c) a hinge member connecting said substantially cam shaped valve seat to said substantially parabolic shaped valve member;

(d) a surrounding soil pipe surrounding said substantially parabolic shaped valve member, said substantially circular support pipe and said hinge member, said surrounding soil pipe providing a channel space between said surrounding soil pipe and said substantially parabolic shaped valve member, said channel terminating in an open chamber between said surrounding soil pipe and said two layered substantially parabolic shaped valve member to result in a lifting or tilting of the closure member; and (e) a liquid backflow pressure responsive assist means disposed on said substantially parabolic shaped valve member to allow a backflow water pressure buoyant force to automatically close said substantially circular valve member.

16. The backflow prevention device of claim 15 further comprising a wax sealing ring disposed on said first end of said substantially circular pipe.

17. The backflow prevention device of claim 16 further comprising a man made or synthetic rubber sealing member disposed in or on said wax ring.

18. The backflow prevention device of claim 15 wherein said liquid backflow pressure responsive means is a closed cell buoyant elastomeric material disposed on said substantially parabolic shaped lower surface along with a concave notch on said substantially parabolic shaped lower surface or a concave notch in said closed cell elastomeric material on said substantially parabolic shaped lower surface.

19. The backflow prevention device of claim 15 wherein said hinge member is composed of an elastomeric material.

20. The backflow prevention device of claim 19 wherein said elastomeric material is a high polymer polymeric material having a living hinge.

\* \* \* \* \*